No. 721,850. PATENTED MAR. 3, 1903.
A. C. WRIGHT.
MEASURING AND FILLING APPARATUS.
APPLICATION FILED JAN. 16, 1902.
NO MODEL. 2 SHEETS—SHEET 1.

Witnesses.
Inventor.
A. C. Wright
by N. A. Acker
his atty

No. 721,850. PATENTED MAR. 3, 1903.
A. C. WRIGHT.
MEASURING AND FILLING APPARATUS.
APPLICATION FILED JAN. 16, 1902.
NO MODEL. 2 SHEETS—SHEET 2.
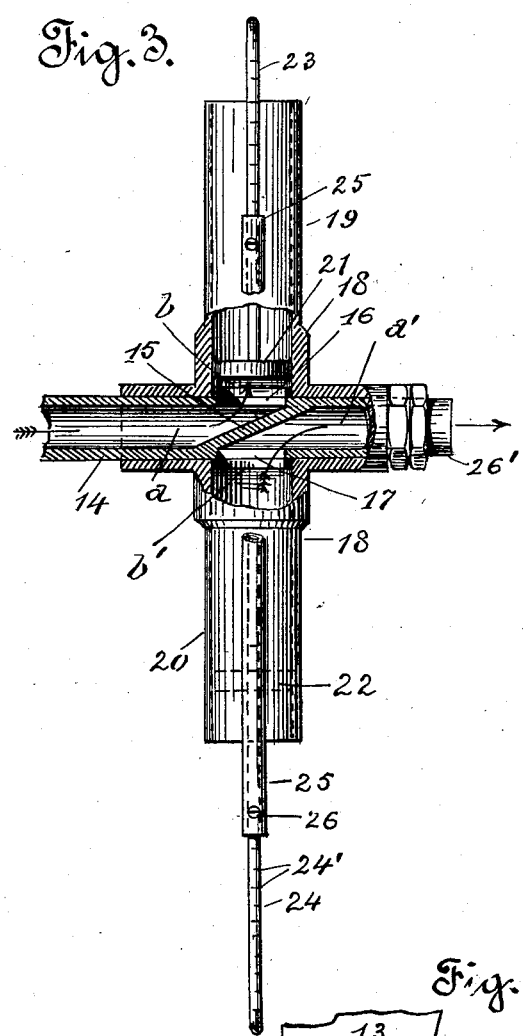
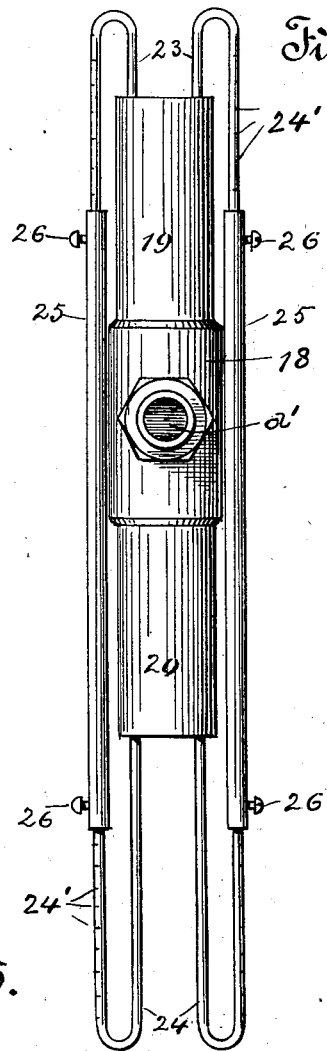
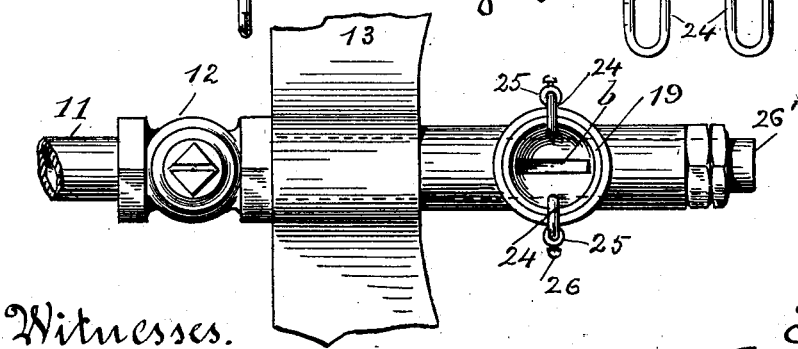
Witnesses.
Inventor.
A. C. Wright
by N. A. Acker
his Atty

UNITED STATES PATENT OFFICE.

ALLEN C. WRIGHT, OF BERKELEY, CALIFORNIA.

MEASURING AND FILLING APPARATUS.

SPECIFICATION forming part of Letters Patent No. 721,850, dated March 3, 1903.

Application filed January 16, 1902. Serial No. 89,962. (No model.)

*To all whom it may concern:*

Be it known that I, ALLEN C. WRIGHT, a citizen of the United States, residing at Berkeley, county of Alameda, State of California, have invented certain new and useful Improvements in Measuring and Filling Apparatus; and I do hereby declare the following to be a full, clear, and exact description of the same.

The invention relates to an apparatus for automatically measuring the liquids and discharging same for the filling of jars, cans, or packages, the object of the invention being to provide a simple and effective device for the measuring out of a given quantity of liquid, syrup, or other fluids and automatically emptying itself into a glass, jar, can, or package located to receive same, the table or holder for the packages having a step motion imparted thereto, whereby the cans, jars, or packages to be filled are brought successively beneath a filling-spout or funnel, which receives the liquid discharged from the measuring-cylinders and delivers same to the vessels to be filled.

To comprehend the invention, reference should be had to the accompanying drawings, wherein—

Figure 1:
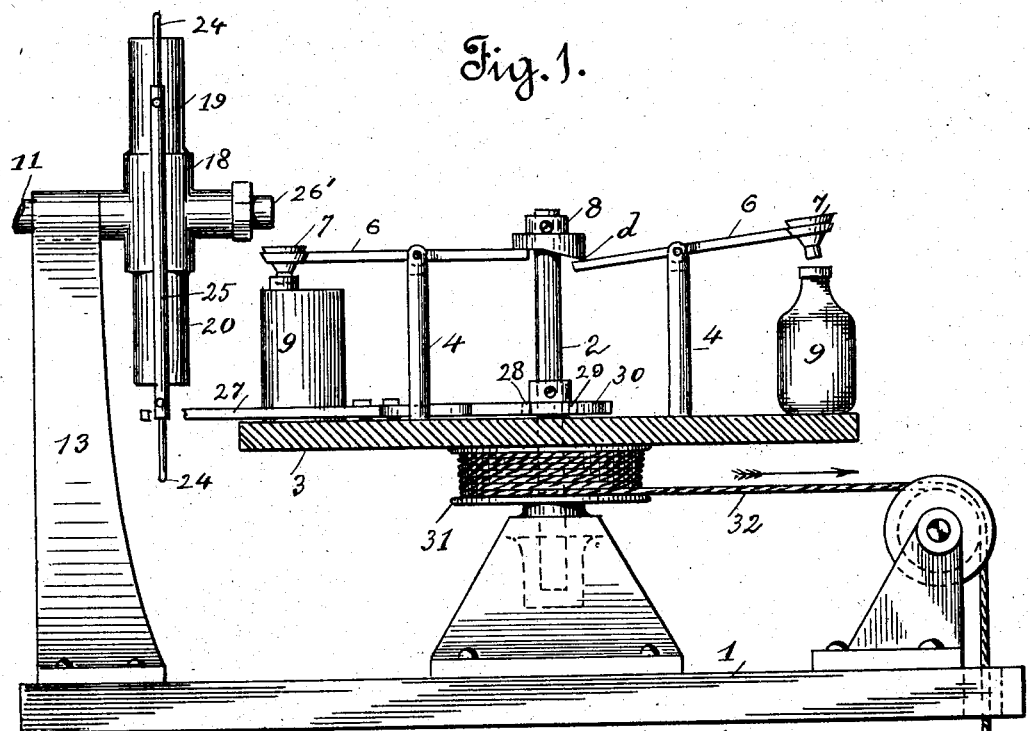
Figure 2:
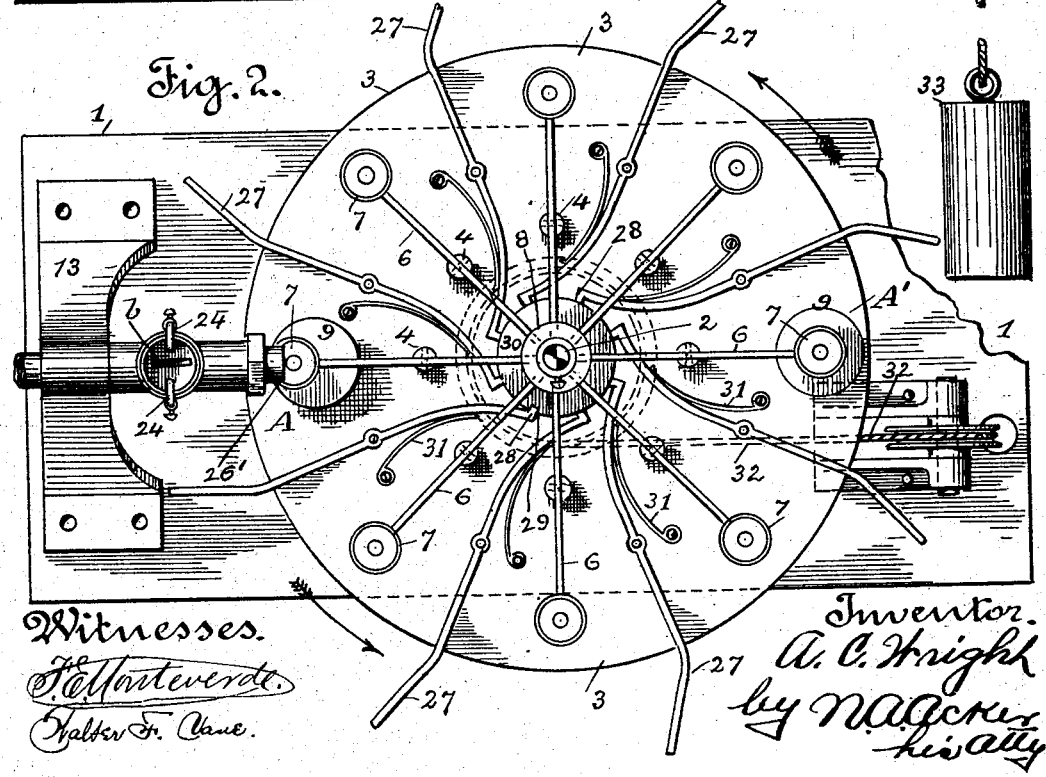

Figure 1 is a side view in elevation of the apparatus, the rotatable table being in section. Fig. 2 is a top plan view of the mechanism disclosed by Fig. 1 of the drawings. Fig. 3 is a detail view of the measuring-cylinders, partly broken away, the valve-shaft and valve-coupling being sectioned. Fig. 4 is a detail front view of the mechanism disclosed by Fig. 3 of the drawings. Fig. 5 is a top plan view of the same, the piston being removed from the exposed measuring-cylinder.

In the drawings the numeral 1 is used to indicate any suitable stand or base provided with an upwardly-extending spindle 2, upon which spindle is rotatably mounted the table or spider 3. To the table is bolted or otherwise secured a number of standards 4, to each standard or support there being fulcrumed a lever 6. Each lever at its outer end carries a funnel or filling-spout 7, the inner end of the said levers resting beneath the cam-collar 8, attached to the upper end of the spindle 2.

The table, carrier, or spider 3 acts as a support for the cans, jars, or packages 9 to be filled, the same being so seated as to place the mouth thereof directly beneath the funnel or spout 7, attached to the fulcrumed levers 6. Means are employed for imparting a step-by-step or intermittent rotation to the support, as will be hereinafter explained.

The above-described mechanism, together with its means for imparting intermittent motion or rotation to the same, constitutes a convenient and simple form of holder and carrier for the packages to be filled and is used in connection with the measuring and filling apparatus in order to facilitate the handling of the packages.

At any suitable point is located a reservoir, which contains the liquid or syrup to be conveyed to the packages. From this reservoir leads the outlet-pipe 11, provided with a controlling or cut-off valve 12, Fig. 5. This pipe 11 is held in place by support 13, and to the free end of said pipe is connected the valve-shaft 14. Said shaft is interiorly divided into compartments or chambers $a$ $a'$ by means of an inclined diaphragm 15. Chamber $a$ is formed with an outlet-port 16, and chamber $a'$ with an inlet-port 17. Upon the valve-shaft is loosely mounted to revolve the valve-coupling 18, to which coupling the cylinders 19 20 are attached. The valve-coupling is formed with the ports $b$ $b'$, which communicate with the cylinders 19 20. Within the cylinders 19 20 work the pistons 21 22, the rods 23 24 of which pistons extend beyond the cylinders 19 20 and are connected to sleeves 25 by set-screws 26, whereby the two pistons are coupled together. The fluid from the reservoir flowing into chamber $a$ is forced therefrom by its head pressure through outlet-port 16 and valve-coupling port $b$ into cylinder 19 until same has become filled with liquid. During the filling of this cylinder piston 21 is forced outward, which, through its connection with piston 22, causes said piston to move inward within its cylinder 20. In case cylinder 20 is filled with liquid the inward movement of piston 22 will force the same therefrom through ports $b'$ and 17 into chamber $a'$, from which it escapes through nozzle 26' and is discharged into funnel or spout 7, located thereunder. The moment the lower cylinder has emptied, the upper one, owing to the weight of the fluid therein, turns over or makes a half-rotation, so as to place the lowermost cylinder or empty one in the uppermost position. It will be understood that the full cylinder is always the lowermost one or assumes such position the moment the lowermost one has emptied itself. As the piston of the uppermost cylinder is moved outward during the filling of said cylinder the piston of the lowermost cylinder is moved inward, so as to gradually empty said cylinder of its contents. It will thus be observed that as one cylinder is filled the companion or opposing cylinder has its contents forced therefrom.

The quantity of fluid carried by the cylinders is dependent upon the size thereof; but I prefer to make same sufficiently large to hold about one gallon or more each. The quantity admitted to and discharged from the cylinders is controlled by the stroke of the pistons working therein. To shorten the stroke of the cylinders, it is only required to loosen the set-screws 26 and move the rods 23 24 into the sleeves 25. When properly positioned, the set-screws 26 are tightened. In order that the operator may be enabled to gage or regulate the quantity of fluid to be admitted into the cylinders, the rods 23 24 have a scale 24' thereon indicating liquid measure from half-pints up to one gallon or whatever may be the maximum measurement for the cylinders.

As the full cylinder rotates or turns to its lowermost position its projecting rod strikes against the outer end of one of a series of arms 27, fulcrumed to the upper face of the table, carrier, or spider 3. The inner end 28 of each arm is inwardly flanged, so as to seat within a socket 29, cut in collar 30, held to spindle 2, each arm being held inward by pressure of springs 31, which bear thereon, there being a spring provided for each arm. As pressure is brought to bear against the outer end of the arm its inner end is moved out of engagement with seat or socket 29 and the table released. When the table is thus released, it is free to rotate one step, or until the next arm 27 moves into locked engagement with collar 30.

During the filling of the upper cylinder it is required that the lower cylinder be held against movement, else the weight of the upper cylinder as it fills will overcome that of the lower cylinder when partially empty and revolve or move into the lowermost position. This may be accomplished by the operator manually engaging the connecting-rods 23 or 24 of the lowermost cylinder as the full cylinder is brought to a state of rest, the cylinder standing at a slight incline and held against movement or rotation, while the connecting-rods may move longitudinally. The connecting-rods will remain thus held until by upward movement they are carried out of engaging position. As the upward movement of the rods of the lower cylinder is equal to the outward movement of the rods of the upper cylinder, the rods of the lower cylinder will not be released until the rods of the upper cylinder have moved outward their full distance. When the rods stand in such position, the upper cylinder will be completely filled and the lower cylinder emptied. The weight of the upper cylinder will cause the same to fall into the lowermost position, forcing the emptied cylinder upward into the position it formerly occupied. Thus the cylinders cannot revolve until the lower one has completely emptied itself and the upper one has become filled. Inasmuch as the pistons of the cylinders work together or in unison it is obvious that the emptying of the lower cylinder and filling of the upper cylinder are proportionate.

Any suitable mechanism may be employed for imparting a step or intermittent rotation to the table. A simple means for this purpose consists of a drum 31, upon which is wound a cord or cable 32. To the opposite end of said cord, chain, or cable is attached a weight 33, which the moment the table is released descends and imparts rotation to the drum 31. Suitable connection is made between the drum and table or carrier, so that the motion of the drum is imparted to the table or carrier as the weight descends. When the weight has descended its full distance, it is required that the chain, cable, or cord be rewound.

The package to be filled is placed on the table or carrier at, say, point A, directly beneath one of the funnels or filling-spout 7 and remains on the table until the same has rotated sufficiently to carry the package to point A'. Inasmuch as the funnel or filling-spout is large enough to receive the entire quantity of liquor discharged from the cylinders, ample time will be given before point A' is reached for all the liquor to drain or run from the funnel or spout into the package. As point A' is reached the inner end of lever 6 moves or rides upon the inclined portion $d$ of cam-collar 8 and is gradually depressed until its outer end is raised, so as to clear the funnel or filling-spout of the mouth of the package being filled, when the same is free to be removed from the table.

It is only required that a single operator be provided to manipulate the apparatus, as it is only necessary to remove the filled packages from the table and insert empty ones in place thereof, the machine being otherwise automatic as to its operation.

Having thus described the invention, what is claimed as new, and desired to be protected by Letters Patent, is—

1. In a measuring and filling machine, alined rotary charge-receiving devices arranged to exchange positions with each other and alternately register with a source of supply, means whereby the admission of a charge to one of said devices will expel the charge from the other device, and means operatively associated with said expelling means and movable longitudinally of the charge-receiving devices adapted to be held to retain said charge-receiving devices slightly off the vertical axis of rotation; substantially as described.

2. In a measuring and filling machine, alined cylinders arranged to exchange positions and alternately register with a source of supply, pistons in said cylinders, piston-rods carried by the pistons, and connecting instrumentalities exterior to the cylinders between the piston-rods whereby the admission of a filling material into one cylinder will eject the material from the other cylinder; substantially as described.

3. In a measuring and filling apparatus, alined cylinders arranged to exchange positions, and alternately register with a source of supply, pistons in said cylinders, and adjustable connecting instrumentalities between the pistons whereby the quantity of material received into and ejected from the cylinders may be regulated; substantially as described.

4. In a measuring and filling apparatus, cylinders arranged to exchange positions, and alternately register with a source of supply, pistons in said cylinders, and adjustable connecting instrumentalities between the pistons whereby the quantity of material received into and ejected from the cylinders may be regulated; substantially as described.

5. In a measuring and filling apparatus, cylinders arranged to exchange positions, and alternately register with a source of supply, pistons in said cylinders, and adjustable connecting instrumentalities exterior to the cylinders between the pistons; substantially as described.

6. In a measuring and filling apparatus, alined cylinders arranged to exchange positions, and alternately register with a source of supply, pistons in said cylinders, and adjustable connecting instrumentalities exterior to the cylinders between the pistons; substantially as described.

7. In an apparatus of the character described, two cylinders adapted to exchange positions to alternately register with a source of supply, pistons in said cylinders, connecting instrumentalities between the pistons whereby the admission of a filling material into one cylinder will eject the material from the other cylinder, and adjusting means for regulating the quantity of the material received into and ejected from the cylinders, substantially as described.

8. In an apparatus of the character described, two cylinders arranged in approximate alinement and adapted to be shifted to alternately register with a source of supply, pistons in said cylinders, connecting-rods 23, 24, carried by the pistons, and means for adjustably connecting the adjacent ends of said rods, substantially as described.

9. In an apparatus of the character described, two cylinders arranged in approximate alinement, adapted to be shifted to register with a source of supply, pistons in said cylinders, connecting-rods 23, 24, carried by the pistons, a sleeve 25 into the ends of which the adjacent ends of the rods 23, 24, project, and binding-screws 26 for holding said rods in adjusted positions in the sleeve, substantially as described.

10. In an apparatus of the character described, two rotatably-mounted cylinders arranged in approximate alinement and adapted to alternately receive and discharge material from a suitable source of supply, pistons in said cylinders, and arms carried by the pistons adapted to project outwardly therefrom whereby said arms may be engaged to retain the cylinders in an inclined position until the upper cylinder is filled and the lower cylinder emptied, substantially as and for the purpose described.

11. In an apparatus of the character described, two rotatably-mounted cylinders arranged in approximate alinement and adapted to alternately receive and discharge material from a suitable source of supply, said cylinders being adapted to be temporarily held in an inclined position, whereby the upper cylinder when filled and released will automatically shift in a rotary direction, and exchange positions with the lower cylinder, the range of movement of the cylinders being a complete revolution in a single direction, substantially as described.

12. In an apparatus of the character described, two cylinders adapted to alternately receive and discharge material from a suitable source of supply, said cylinders being adapted to be held at an inclination so that as the one is filled with material and released it will automatically exchange positions with the other, the movement of the cylinders being in a single direction, substantially as described.

13. In an apparatus of the character described, two rotatably-mounted cylinders arranged in approximate alinement and adapted to alternately receive and discharge material from a suitable source of supply, pistons in said cylinders and connecting instrumentalities between the pistons whereby the admission of filling material into one cylinder will eject the material from the other cylinder, said connecting instrumentalities being adapted to be temporarily held against movement to normally maintain the cylinders in an inclined position, whereby the upper cylinder when filled and released will automatically exchange positions with the lower cylinder, the range of movement of the cylinders being a complete revolution in a single direction, substantially as described.

14. In an apparatus of the character described, a plurality of rotatably-mounted cylinders adapted to alternately receive and discharge material from a suitable source of supply, pistons in the cylinders, connecting instrumentalities between the pistons whereby the admission of a filling material into one cylinder will eject the material from the other cylinder, said connecting instrumentalities being adapted to be temporarily held against movement to normally maintain the cylinder being filled at one side of the vertical plane of its axis of rotation whereby the said cylinder when filled and released will automatically shift in a rotary direction and exchange positions with the lower cylinder, the movement of the cylinders being in a single direction, substantially as described.

15. In an apparatus of the character described, two cylinders adapted to be shifted to alternately register with a source of supply, pistons in said cylinders, adjustable connecting instrumentalities between the pistons whereby the admission of a filling material into one cylinder will eject the material from the other cylinder, and indicating devices for determining the degree of adjustment to regulate the quantity of material received into and discharged from the cylinders, substantially as described.

16. In a measuring and filling apparatus, the combination with a rotatable valve-coupling, of the opposing cylinders carried thereby, communication between the coupling and the cylinders, pistons working within the cylinders, connection between the pistons whereby the outward movement of one piston causes the inward movement of the opposing piston, and means for varying the stroke of the respective pistons whereby the admission of fluid into and the discharge of fluid from the cylinders are controlled, substantially as described.

17. The combination with a rotatable carrier or table, of a series of lock-arms fulcrumed thereto, rotatable receiving and exhausting cylinders, said cylinders during their rotation serving to engage the lock-arms to release the table, means associated with said lock-arms for preventing rotation of the table, and means for rotating the table when the same is released, substantially as described.

18. The combination with a rotatable carrier or table, a lock-arm fulcrumed thereto, rotatable receiving and exhaust cylinders, said cylinders during their rotation serving to engage the lock-arm to release the table, means associated with the lock-arm for holding the table against rotation, and means for rotating the table when released, substantially as described.

19. The combination with a rotatable carrier or table, of a series of lock-arms fulcrumed thereto, a rotatable filling device operatively associated with said arms and adapted during rotation to engage the same and release the table, means adapted to engage the arms to hold the table against rotation, and means for rotating the table when released, substantially as described.

20. The combination with a rotatable carrier or table, of a lock-arm fulcrumed thereto, a filling device operatively associated with said arm, and adapted during operation to engage the same to release the table, means adapted to engage the arm to hold the table against rotation, and means for rotating the table when released, substantially as described.

21. The combination with a rotatable filling mechanism, of a rotatable table or carrier for packages to be filled, a plurality of funnels for the packages, arms carrying the funnels, and standards, one for each funnel-carrying arm, on the table to which the funnel-carrying arms are fulcrumed, substantially as described.

22. The combination with a rotatable filling mechanism, of a rotatable table or carrier for packages to be filled, a plurality of funnels for the packages, arms carrying the funnels, standards on the table to which the funnel-carrying arms are fulcrumed, and means for engaging said funnel-carrying arms for alternately raising and lowering the funnels as they successively approach the filling mechanism during the rotation of the table, substantially as described.

23. The combination with a rotatable filling mechanism, of a rotatable table or carrier for a package to be filled, a funnel for the package, an arm carrying the funnel, a standard on the table to which the funnel-carrying arm is fulcrumed, and means for engaging said funnel-carrying arm for alternately raising and lowering the funnel as it approaches the filling mechanism during the rotation of the table, substantially as described.

In witness whereof I have hereunto set my hand.

ALLEN C. WRIGHT.

Witnesses:
N. A. ACKER,
D. B. RICHARDS.